(12) United States Patent
Howlett et al.

(10) Patent No.: US 8,464,005 B2
(45) Date of Patent: *Jun. 11, 2013

(54) ACCESSING COMMON REGISTERS IN A MULTI-CORE PROCESSOR

(75) Inventors: Warren K. Howlett, Fort Collins, CO (US); Christopher L. Lyles, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,689

(22) Filed: May 4, 2012

(65) Prior Publication Data

US 2012/0221831 A1 Aug. 30, 2012

Related U.S. Application Data

(63) Continuation of application No. 11/152,305, filed on Jun. 14, 2005, now Pat. No. 8,209,492.

(51) Int. Cl.
*G06F 12/00* (2006.01)

(52) U.S. Cl.
USPC ........... 711/147; 711/128; 711/141; 711/144; 711/145; 711/146; 711/148

(58) Field of Classification Search
USPC .................. 711/141, 144, 145, 146, 147, 148
See application file for complete search history.

(56) References Cited

U.S. PATENT DOCUMENTS

| | | | |
|---|---|---|---|
| 5,168,547 A | 12/1992 | Miller et al. | |
| 5,434,970 A * | 7/1995 | Schiffleger | 709/213 |
| 5,669,002 A | 9/1997 | Buch | |
| 5,917,771 A | 6/1999 | Hill | |
| 6,594,736 B1 | 7/2003 | Parks | |
| 6,857,035 B1 | 2/2005 | Pritchard et al. | |
| 6,895,479 B2 * | 5/2005 | Reimer et al. | 711/152 |
| 6,904,499 B2 | 6/2005 | Fanning | |
| 6,904,503 B2 | 6/2005 | Urabe et al. | |
| 8,209,492 B2 * | 6/2012 | Howlett et al. | 711/147 |
| 2004/0107323 A1 * | 6/2004 | Matsuura et al. | 711/150 |
| 2006/0070054 A1 | 3/2006 | Naik et al. | |

* cited by examiner

*Primary Examiner* — Tuan Thai
*Assistant Examiner* — Zhou Li

(57) ABSTRACT

Systems and methods for accessing common registers in a multi-core processor are disclosed. In an exemplary embodiment a method may comprise streaming at least one transaction from one of a plurality of processing cores in a core domain directly to a register domain. The method may also comprise reassembling the at least one streamed transaction in the register domain for data access operations at the common registers.

20 Claims, 6 Drawing Sheets

ACCESSING COMMON REGISTERS IN A MULTI-CORE PROCESSOR

PRIORITY CLAIM

This application claims priority as a continuation of U.S. patent application Ser. No. 11/152,305 filed on Jun. 14, 2005 now U.S. Pat. No. 8,209,492 and titled "Systems and Methods of Accessing Common Registers In A Multi-Core Processor" of Warren K. Howlett, et al., incorporated by reference as though fully set forth herein.

TECHNICAL FIELD

The described subject matter relates to multi-core processors, and more particularly to systems and methods of accessing common registers in a multi-core processor.

BACKGROUND

There is ongoing work to enhance computer system performance, e.g., by increasing processing speed. Central processing units (CPUs) having multiple processing cores are now being developed to increase the processing speeds of high-end server computers, and even other computing devices. Multi-core processors are commercially available with at least two processing cores and a shared bus interface. Configuration and status registers are provided for each processing core, but the processing cores may also need access to shared configuration and status registers in the bus interface.

In an exemplary implementation, the shared configuration and status registers are mapped to a memory address range on the system bus and the processing cores may access the shared configuration and status registers by issuing transactions over the system bus. Software is provided to handle access operations for both the core registers and the common registers. In addition, the software has to arbitrate access to the common registers to prevent simultaneous writes by both processing cores. Such an approach is relatively slow.

DETAILED DESCRIPTION

Briefly, systems and methods described herein may be implemented to access common registers in a multi-core processor. In an exemplary embodiment, core logic may be provided in a core domain for streaming transactions from the core domain to a register domain (e.g., 64-bit transactions in 16-bit segments). Bus interface logic may be provided in the register domain for reassembling the streamed transactions for data access operations at the common registers. In an exemplary write operation, data contained in the streamed transactions may be collected by a write staging register, and then written to the common registers. In an exemplary read operation, data may be read from the common registers and streamed to the core domain (e.g., in 16-bit segments) and collected by a read buffer for the processing core.

Exemplary systems and methods described herein increase processing speed, are tolerant of different clock domains, and support back-to-back streaming by a plurality of processing cores. In addition, data written to the common registers by one processing core is immediately visible to the other processing cores, and the number of interface wires between each processing core and the bus interface are relatively small (e.g., 22 wires for the write interface and 19 wires for the read interface in an exemplary embodiment).

Exemplary System

Figure 1:
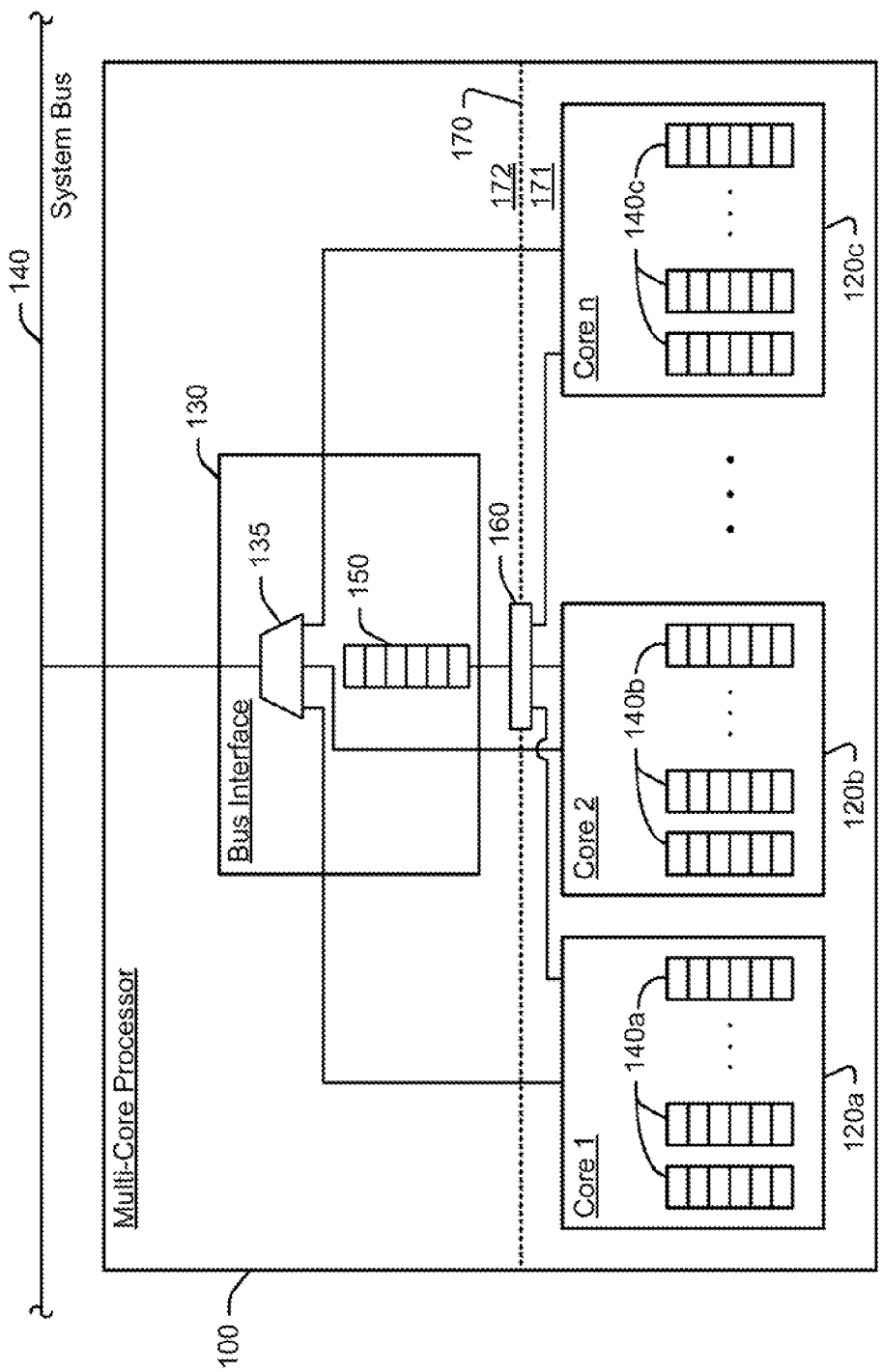
FIG. 1 is a high-level schematic diagram of an exemplary multi-core processor having common registers.

FIG. 1 is a high-level schematic diagram of an exemplary multi-core processor. Exemplary multi-core processor 100 may be an Intel Processor Family (IPF)-based chip, such as the Itanium® processor (Intel Corporation) implemented in server computers. However, it is noted that exemplary multi-processor 100 is shown for purposes of illustration and is not intended to be limiting. Nor are multi-core processors (e.g., multi-core processor 100) limited to use in server computers. Other suitable computer systems which may implement a multiprocessor architecture include, but are not limited to, personal computers (PCs), laptop computers, network workstations, electronic appliances, and other computing devices.

Multi-core processor 100 may include a number of (i.e., one or more) processing cores 120a-c. In an exemplary embodiment, the multi-core processor architecture includes two processing cores. However, multiprocessor architectures are not limited to any particular configuration and may include more than two processing cores (e.g., illustrated in FIG. 1 as "n" processing cores).

Multi-core processor 100 may also include a bus interface 130 that couples (illustrated by multiplexer 135) the processing cores 120a-c to other system components (e.g., a memory controller, I/O controllers, etc.) via a system bus 140. In an exemplary embodiment, the system bus 140 may be a front side bus (FSB), although the system bus may be implemented using any of a variety of bus architectures.

Multi-core processor 100 may also include configuration and status registers for each of the processing cores 120a-c. For example, core registers 140a-c are illustrated in processing core 120a-c, respectively. Core registers 140a-c may be linked to one another in an arrangement referred to herein as a "crab-chain". A crab chain is an interface between the core registers within each of the processing cores 120a-c, wherein transactions are issued as segments for delivery from one core register to the next, e.g., in "chain" fashion. An exemplary crab-chain may be implemented as a 16-bit bus in the processing cores for handling read/write requests in the core registers.

One or more common registers 150 may also be shared by two or more of the processing cores 120a-c in the multi-core processor. Common registers 150 may be provided as part of the bus interface 130, as shown in FIG. 1, although other implementations are also contemplated. In an exemplary embodiment, the common registers 150 may be coupled to the core registers 140a-c in the crab chain for one or more of the processing cores 120a-c.

The core registers 140a-c and common registers 150 may reside in different clock domains within the multi-core processor 100, illustrated by boundary 170 in FIG. 1. The term "clock domains" refers to different areas of the multi-core processor 100 which are operating at different frequencies. For example, the core registers 140a-c may reside in a core domain 171 and the common registers may reside in a register domain 172. Although not shown for purposes of simplicity, it is noted that each processing core 120a-c may also reside in separate core domains.

Transactions may be streamed as segments (e.g., 64-bit transactions may be streamed as 16-bit segments) from the core domain to the register domain, and vice versa. Logic may be provided in the receiving domains to reassemble the segments into transactions. In an exemplary embodiment, core logic and bus interface logic may be provided to stream transactions between the core domain(s) 171 and the register domain 172. A synchronizer 160 may also be provided between the core domain 171 and the register domain 172 for timing streamed transactions between domains. Exemplary core logic, bus interface logic, and synchronizer logic are each described in more detail below with reference to FIGS. 2-4.

Figure 2:
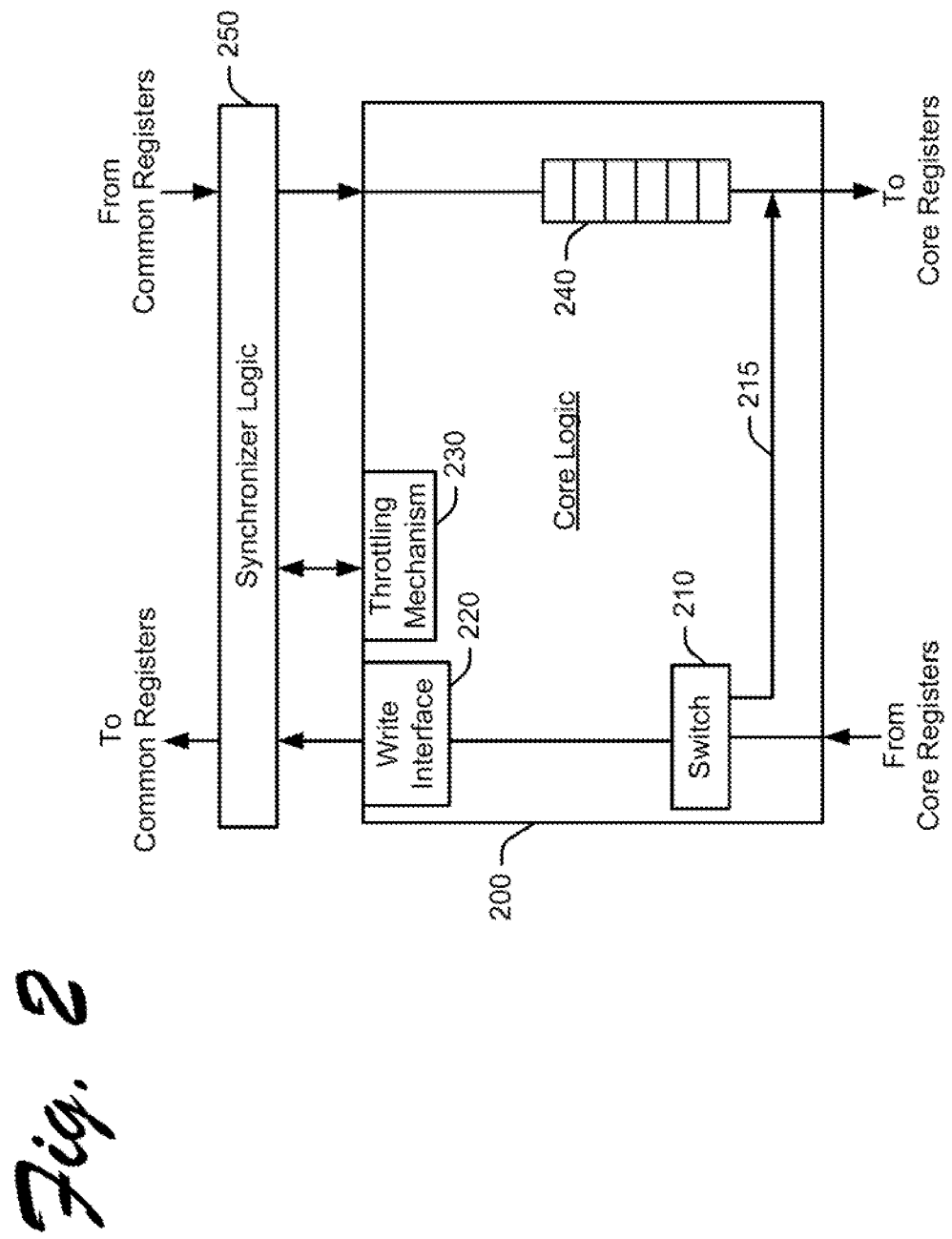
FIG. 2 is a schematic diagram of exemplary core logic which may be implemented for accessing common registers in a multi-core processor.

FIG. 2 is a schematic diagram of exemplary core logic which may be implemented for accessing common registers in a multi-core processor. Exemplary core logic 200 may be provided, e.g., as logic circuitry, in the core domain for each of the processing cores (e.g., the processing cores 120a-c in core domain 171 in FIG. 1).

In an exemplary embodiment, the core logic 200 is coupled to the core registers as a link in the crab chain. For example, transactions for write operations may be issued over the crab chain and input to switch 210 in the core logic 200. Switch 210 determines whether the transaction should be issued to the common registers (e.g., the common registers 150 in FIG. 1) or another core register (e.g., core registers 140a in FIG. 1) in the processing core.

In an exemplary embodiment, switch 210 may read an address from a header for the transaction. If the transaction is addressed to another core register, core logic 200 returns the transaction to the crab chain via bypass 215. Alternatively, if the transaction is addressed to the common registers, core logic 200 issues the transaction to a write interface 220.

Write interface 220 may be implemented to stream the transaction. For example, a 64-bit transaction may be streamed as four 16-bit segments. Each of the 16-bit segments may be streamed to the common registers (e.g., one segment on each clock cycle).

As mentioned above, the core logic 200 may be in a different clock domain than the common registers (e.g., core domain 171 and register domain 172 in FIG. 2). Accordingly, synchronizer logic 250 (e.g., synchronizer 160 in FIG. 1) may be provided on the domain boundary for timing streamed transactions between the register domain and the core domain.

In an exemplary embodiment, a throttling mechanism 230 may be provided in the core logic 200 to control flow so that the synchronizer logic 250 does not become overwhelmed, e.g., if the processing cores are faster than the bus interface. Exemplary throttling mechanism 230 may interface with the synchronizer logic 250 to monitor one or more queues in the synchronizer logic 250.

Throttling mechanism 230 may be implemented as flow control counters which monitor one or more queues at the synchronizer. If the synchronizer queues reach a predetermined threshold, throttling mechanism 230 may issue a control signal to the write interface causing the write interface to slow (or "throttle") streaming transactions to the synchronizer.

For purposes of illustration, if 64-bit transactions are being streamed as four 16-bit segments, the threshold may be at least four available slots in the synchronizer queue(s). If less than four empty slots are available, throttling mechanism may issue a control signal to the write interface causing the write interface to discard some of the segments. It is noted that discarding segments may result in data corruption. To reduce the occurrence of discarded segments, the software developer may space write instructions, e.g., such that a serialized instruction is issued to flush the chain after every four write instructions.

If four empty slots become available in the synchronizer queue(s), throttling mechanism 230 may then issue another control signal to the write interface enabling the write interface to write all four segments of subsequent transactions.

Core logic 200 may also enable read operations. For example, data read from the common registers may be streamed to the core logic 200 (via synchronizer logic 250) as segments of data. The segments of data may be written to a read buffer 240 in the core logic 200 to reassemble the transaction. When all of the segments are received, the transaction may be issued to the core registers over the crab chain.

Figure 3:
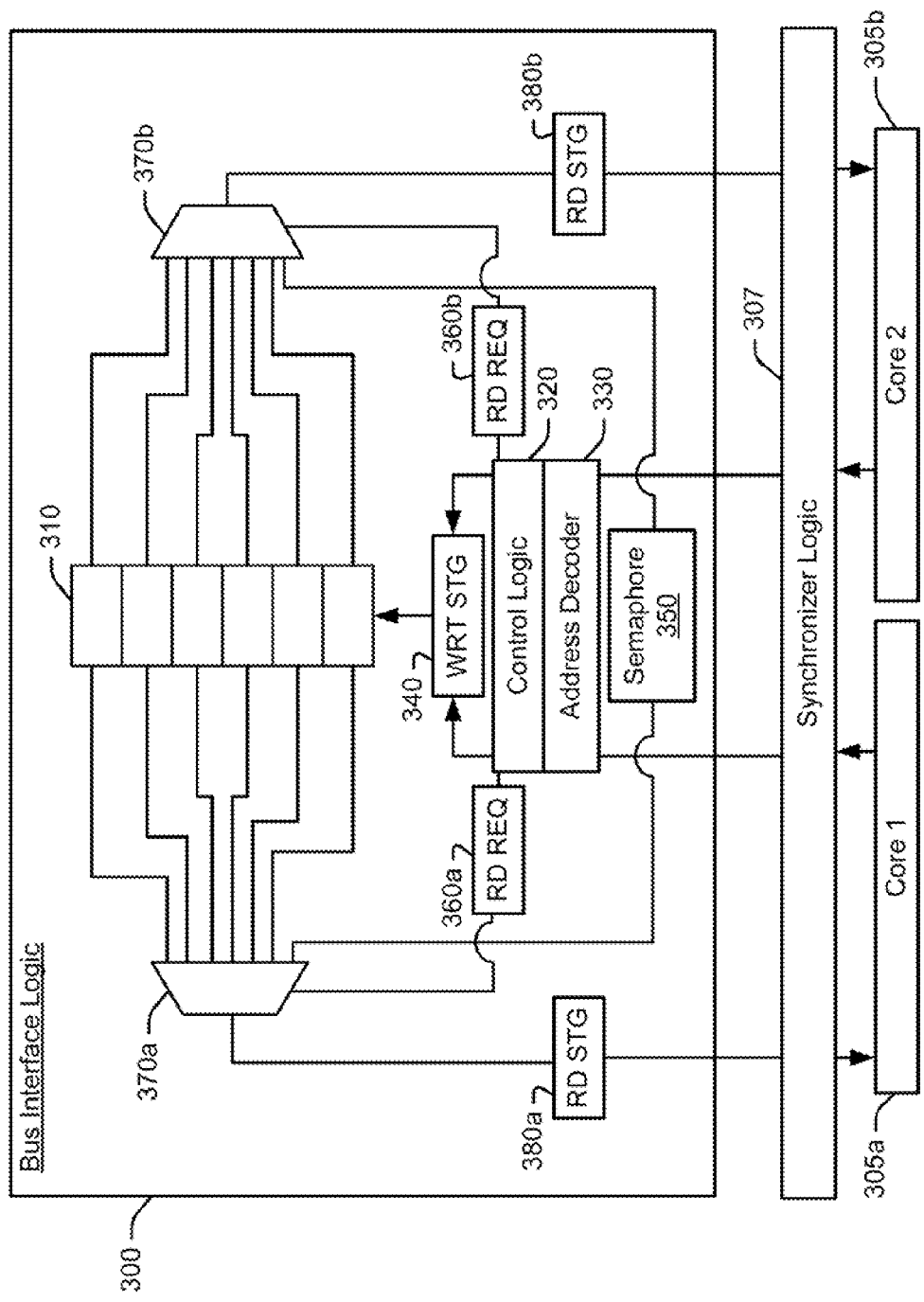
FIG. 3 is a schematic diagram of exemplary bus interface logic which may be implemented for accessing common registers in a multi-core processor.

FIG. 3 is a schematic diagram of exemplary bus interface logic which may be implemented for accessing common registers in a multi-core processor. Exemplary bus interface logic 300 may be provided for each of the common registers, e.g., as logic circuitry in the register domain to handle transactions from the cores 305a-b. In an exemplary embodiment, the bus interface logic 300 couples transactions from the synchronizer logic 307 to the common registers 310 (e.g., the common registers 150 in register domain 172 in FIG. 1) via a write data path and a read data path.

In an exemplary embodiment, control logic 320 may be provided to determine whether the transaction is a write request or a read request. The control logic 320 may read header information from the transaction identifying the transaction type. For example, one bit of a dedicated write interface may be a write-enable bit.

If the transaction is identified as a write request, the transaction is reassembled by collecting the segments in a write staging register 340. After all of the segments are collected and the transaction is reassembled at the write staging register 340, the transaction may be written to one or more of the common registers 310.

An address decoder 330 may be provided in the bus interface logic 300 to identify register entries in the common registers for writing or reading data. The address decoder 330 may also read header information from the transaction identifying the register entries. For example, five bits of the dedicated write interface may be used for the address. Accordingly, data may be written to and/or read from the common register at the register entries identified by the address in the transaction header.

A semaphore 350 may also be provided in the bus interface logic 300 to protect against simultaneous writes by more than one processing core. The semaphore 350 may be implemented as "fairness" logic. The processing core must "own" the semaphore before transactions from the processing core are written to the common registers 310.

In an exemplary embodiment, the processing core comes to "own" the semaphore as follows. The processing core issues a read instruction identifying the common registers 310 (e.g., by address) to the semaphore. The semaphore determines whether the common registers 310 are available, and if so, notifies the processing core (e.g., by returning a logical 1 in response to the read instruction). If the common registers 310 are not available, the semaphore notifies the processing core that it will have to wait until the common registers 310 become available (e.g., by returning a logical 0 in response to the read instruction).

After a processing core has accessed the common registers 310, the processing core may release the semaphore. In an exemplary embodiment, the processing core may issue a write instruction (e.g., including a logical 0) to the semaphore, indicating that the common registers 310 have been released and are available for another processing core.

If the transaction is identified as a read request, a multi-step process may be implemented. First, an address in the transaction header is written into a read request register 360a or 360b for the respective processing core (e.g., Core 1 or Core 2). Then an instruction is executed that flushes the crab chain. Meanwhile, a multiplexer 370a or 370b for the respective processing core is activated to read data read from the common registers 310, e.g., from the register entries identified by the address.

Data read from the common registers 310 is issued to a read staging register 380a or 380b for the respective processing core requesting the data (e.g., processing core 350a or 350b). The transaction may then be streamed (e.g., as data segments) to the processing core requesting the data (e.g., processing core 350a or 350b).

It is noted that although bus interface logic 300 is shown in FIG. 3 providing two processing cores (e.g., processing core 350a or 350b) with shared access to common registers 310, bus interface logic may be provided to enable any number of processing cores to access the common registers.

Figure 4:
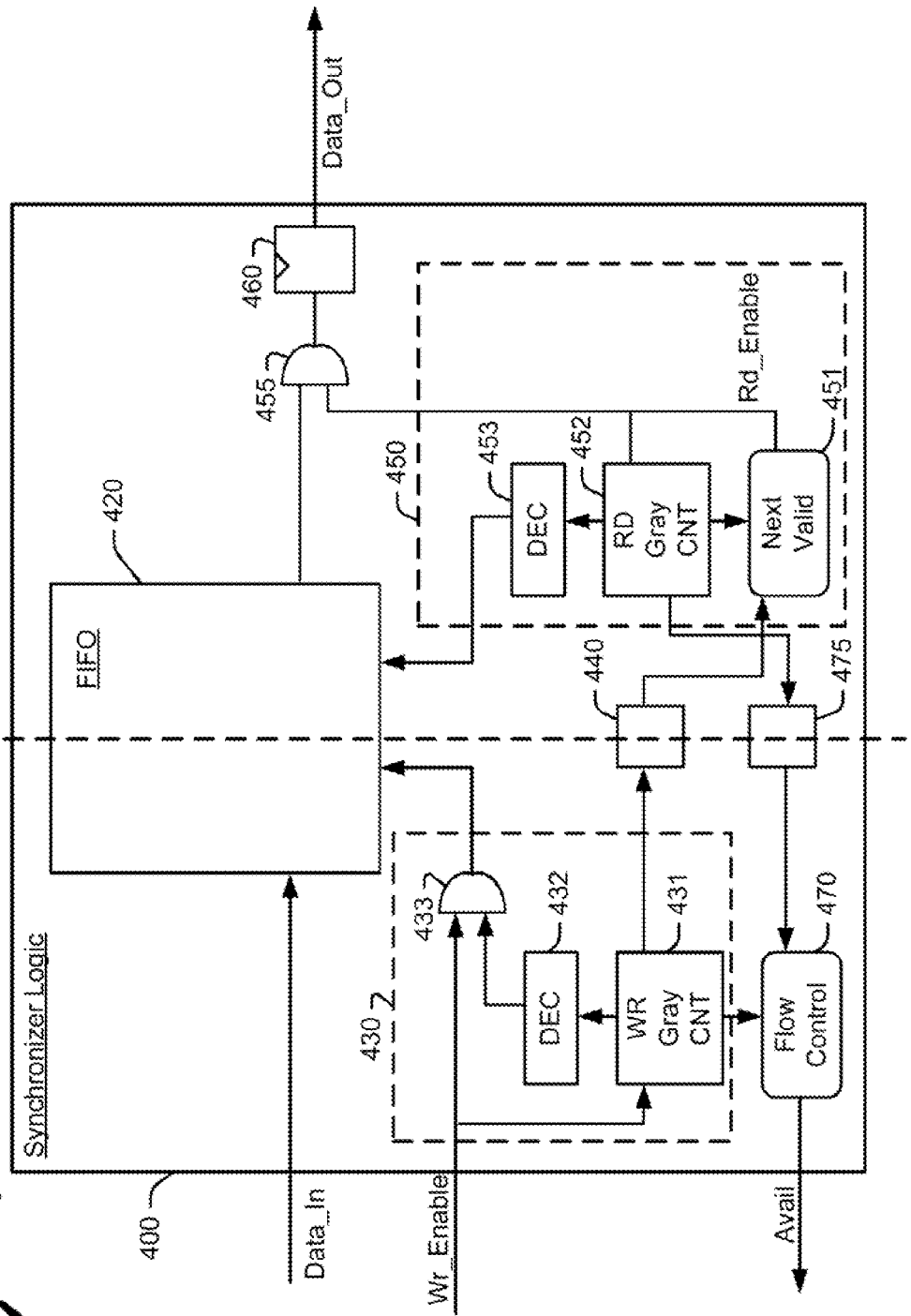
FIG. 4 is a schematic diagram of exemplary synchronizer logic which may be implemented for accessing common registers across domains in a multi-core processor.

FIG. 4 is a schematic diagram of exemplary synchronizer logic which may be implemented for accessing common registers across domains in a multi-core processor. Exemplary synchronizer logic 400 may be provided across boundary 410 for handling transactions between first domain 411 and second domain 412 (such as core domain 171 and register domain 172 in FIG. 1). In order to simplify the drawing, exemplary synchronizer logic 400 is shown as it may be used to transfer transactions in one direction, e.g., from the core domain to the register domain or vice versa. It is noted, however, that synchronizer logic may be readily expanded to handle transactions in both directions.

Synchronizer logic 400 may include a first-in/first-out (FIFO) buffer 420 for storing transaction segments (e.g., Data_In) as they are received. Write-counter 430 increments a pointer in the FIFO buffer 420 so that transaction segments are written in the first domain 411 to consecutive entries in the FIFO buffer 420.

In an exemplary embodiment, writer-counter 430 may be implemented as a write gray counter 431, decoder 432, and AND gate 433. A write-enable signal may be received for each transaction segment at write gray counter 431 and the AND gate 433. The write gray counter 431 changes 1-bit at a time to avoid noise (or glitches") in the counter value while synchronizing the clock domains. Decoder 432 is coupled to output from gray counter 431 and changes the 4-bit output into a 16-bit write vector for the FIFO 420 qualified by the write enable signal. The qualified write-enable signal points to another entry or slot in the FIFO buffer 420 for receiving the transaction segments.

Output from the write gray counter 420 may also be issued across the boundary 410 via resolver latch 440 to a read-counter 450. Read-counter 450 increments another pointer in the FIFO buffer 420 so that transaction segments are read out from consecutive entries of the FIFO buffer 420 in the second domain 412.

In an exemplary embodiment, read-counter 450 may be implemented as next valid logic 451, read gray counter 452 and decoder 453. The next valid logic 451 maintains the read-counter 450 "in-step" with the write-counter 430 by issuing a read-enable signal corresponding to each write-enable signal. The read-enable signal is issued via read gray counter 452 and decoder 453 to FIFO buffer 420, and increments the pointer for reading segments from the FIFO buffer 420. Although a segment may be read from the FIFO buffer 420, it is not issued until the read-enable signal is qualified at AND gate 455. The transaction may then be staged at latch 460 before being issued in the register domain (e.g., Data_Out).

Synchronizer logic 400 may also include flow control 470. Flow control 470 may receive input from both domains 411 and 412, e.g., via write gray counter 431 and read gray counter 452 (via resolving latch 475). Flow control 470 may be implemented to monitor how many register entries in FIFO buffer 420 have been written and how many have been read in order to protect against overflow at the FIFO buffer 420.

Flow control 470 may issue a signal (Avail) may be issued to the sending domain 411 indicating the status of the FIFO buffer 420. For example, throttling mechanism (230 in FIG. 2) may slow or stop streaming transactions if the FIFO buffer 420 is nearing capacity or full (e.g., based on a predetermined threshold).

It is noted that the exemplary embodiments discussed above are provided for purposes of illustration. Still other embodiments are also contemplated.

Exemplary Operations

Figure 5:
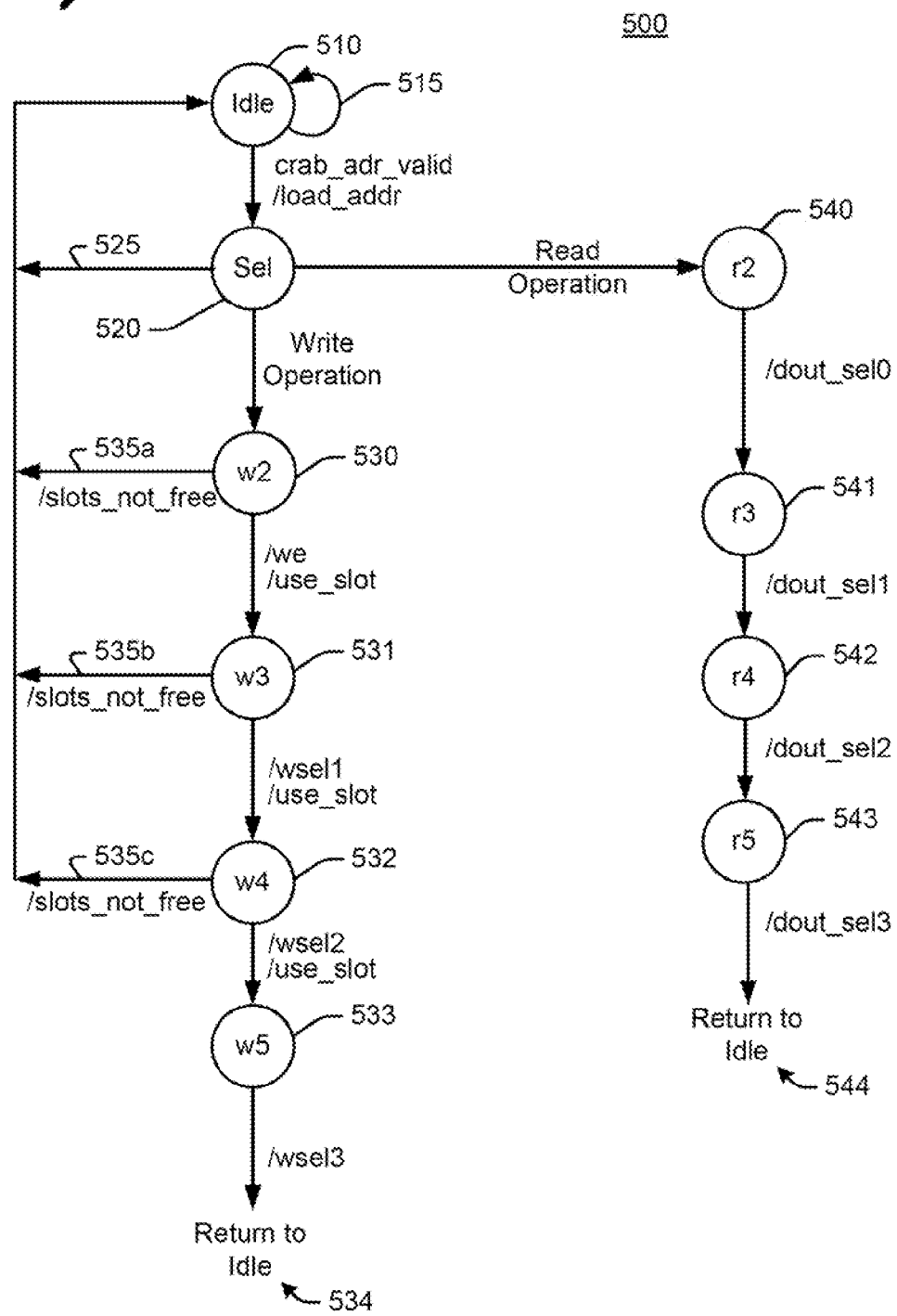
FIG. 5 is a state diagram illustrating exemplary access operations in a core domain.
Figure 6:
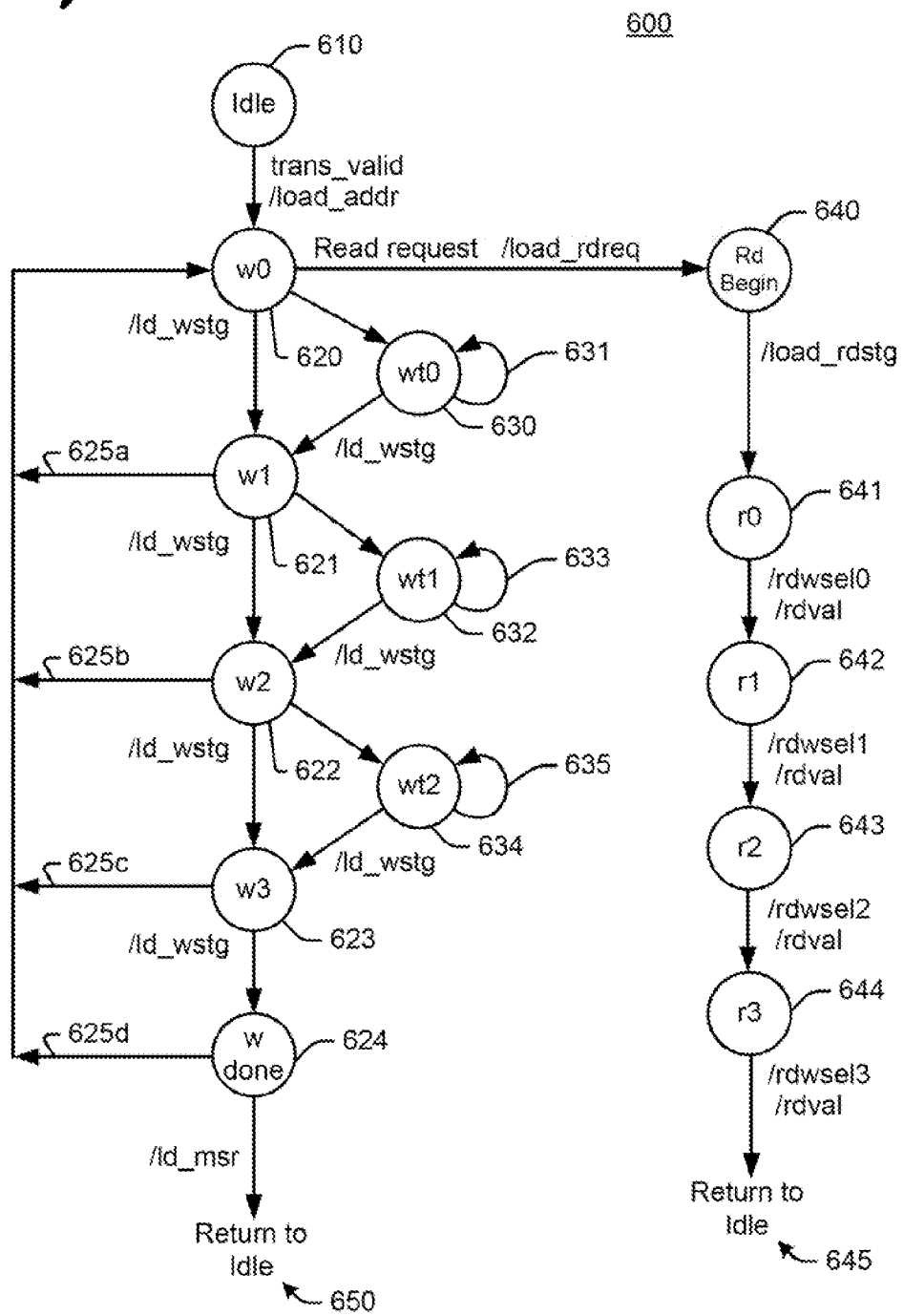
FIG. 6 is another state diagram illustrating exemplary access operations in a register domain.

FIGS. 5 and 6 are state diagrams illustrating access operations for common registers in a multi-core processor. The operations may be embodied as logic instructions. In an exemplary embodiment, the components and connections depicted in the figures may be used to access common registers in a multi-core processor.

FIG. 5 is a state diagram illustrating exemplary access operations in a core domain. State 510 indicates that a system (e.g., the core logic) is idle. In an exemplary embodiment, the core logic may remain in idle state 510 waiting for a transaction, as illustrated by loop 515. If a transaction is received, the address is read from the transaction (indicated by "crab_adr_valid") and the core logic loads the transaction address ("/load_addr") and transitions to a select state 520. If the transaction is not addressed to the common registers, the core logic returns to an idle state 510 as indicated by loop 525. Alternatively, if the transaction is addressed to the common registers, a determination is made in the core domain whether the transaction is a write operation or a read operation.

If the transaction is a write operation, the core logic transitions to a first write-enable state 530. Otherwise, if the transaction is a read operation, the core logic transitions to a first read state 540.

Before continuing, it is noted that the term "write operation" is used herein to designate a transaction in the core domain which is addressed to the common registers. A write operation is streamed from the core domain to the register domain. Accordingly, a write operation may include a write request or a read request for the common registers.

The term "read operation" is used herein to designate a transaction in the core domain which is received from the common registers. A read operation is streamed from the register domain to the core domain. For example, a read operation may include data read from the common registers in response to a read request.

Returning to the first write-enable state 530, the core logic stages a first segment of the transaction at the write interface (indicated by a write-enable instruction: /we), and notifies a throttling mechanism that a first slot in the write interface is occupied (indicated by a use-slot instruction: /use_slot).

The core logic continues streaming the transaction (e.g., as segments) to the write interface in the core domain, as illustrated by the transitions to a second write-enable state 531, a third write-enable state 532, and a fourth write-enable state 533. As the core logic transitions to each write-enable state 531-533, the transaction is staged in segments at the write interface (indicated by a write-select instructions: /wsel), and the throttling mechanism is notified of the number of slots in the write interface which are occupied (indicated by the use-slot instructions: /use_slot).

When all the segments of the transaction have finished streaming from the core domain to the register domain, the core logic may then return to an idle state 510, as indicated by loop 534.

In an exemplary embodiment, a determination is made whether there are sufficient slots available at the write interface for streaming the transaction. If the write interface does not include sufficient slots for streaming the transaction, e.g., as determined by the throttling mechanism, then the core logic may return to idle state 510, as indicated by loops 535*a-c*.

Turning again to the select state 520, if the transaction is a read operation, the core logic transitions to a first read state 540. In first read state 540, the core logic selects a first staged segment of the transaction from the read buffer (indicated by a read instruction: /dout_sel=1). The segment is return on the crab-chain.

The core logic continues selecting the segments from the read buffer, as illustrated by the transitions to a second read state 541, a third read state 542, and a fourth read state 543. As the core logic transitions to each read state 531-533, the segments are selected from the read buffer (indicated by read instructions: /dout_sel). The segments are returned on the crab-chain. When all the segments of the transaction have been returned on the crab-chain, the core logic may then return to an idle state 510, as indicated by loop 544.

FIG. 6 is another state diagram illustrating exemplary access operations in a register domain. State 610 indicates that a system (e.g., the bus interface logic) is idle. If a transaction is received (indicated by trans_valid input), the address is read from the transaction (indicated by a load address instruction: /load_addr). Regardless of whether the transaction indicates a write request or a read request, the bus interface logic transitions to a first write-enable state 620.

For a write request, the bus interface logic transitions to a second write-enable state 621 by writing a first segment to a write staging register in the register domain (indicated by a load write-staging register instruction: /ld_wstg). The bus interface logic continues writing the transaction (e.g., as segments) to the write staging register, as illustrated by the transitions to a second write state 622, a third write state 623, and a fourth write state 624. As the bus interface logic transitions to each write state 621-624, the transaction is staged in segments at the write staging register in the register domain (indicated by write instructions: /ld_wstg).

If the core domain is slower than the register domain, however, receiving the streamed transaction from the core domain may be delayed in the register domain. Accordingly, the first segment may not be ready to write. In such a case, the bus interface logic first transitions to a wait state 630 (and 632 and 634) and loops 631 (and 633, 635) until the segments are ready to write, before transitioning to the next write-enable state 621 (and 622 and 623).

When all of the segments have been staged at the write staging register in the register domain, the bus interface logic may write the common registers (indicated by register write instruction: /ld_msr). The bus interface logic may then return to an idle state 610, as indicated by loop 650.

In an exemplary embodiment, a determination is made whether there is sufficient time to finish the write request or if another transaction is being received from the core domain. If there is insufficient time to finish the write request, then the bus interface logic may skip to w0 state 620 (indicated by loops 625*a-d*) so that the bus interface logic is ready to receive the next transaction.

Turning again to the first write-enable state 620, if the transaction is a read request, then the bus interface logic loads the read request into a read request register (indicated by read instruction: /load_rdreq) and transitions to a first read state 640. In first read state 640, the bus interface logic loads the read data from the selected common register into a read staging register (indicated by read instruction: /load_rdstg). The bus interface logic then transitions to read states 641-644 by in turn selecting each of the requested data segments from the read staging register (indicated by read instructions: /rd-wsel) and driving that data segment back to the core domain along with a valid flag (indicated by read instruction: /rdval). Bus interface logic may then return to an idle state 610, as indicated by loop 645.

The operations shown and described herein are provided to illustrate exemplary embodiments of accessing common registers in a multi-core processor. It is noted that the operations are not limited to the embodiments shown. Still other operations may also be implemented to enable common registers in a multi-core processor.

By way of example, access operations are shown in FIGS. 5 and 6 being streamed between the core and register domains as four segments. It is noted, however, that four segments are shown merely for purposes of illustration and are not intended to be limiting. Other embodiments are also contemplated, which may include streaming fewer or more than four segments. It is also noted that the number of segments implemented for write operations and read operations do not need to be the same.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system for accessing common registers in a register domain in a multi-core processor, comprising:
   core logic provided at each of a plurality of processing cores in a core domain, the core logic streaming at least one transaction from the core domain to the register domain, wherein both the core domain and the register domain are different clock domains in the same multi-core processor; and
   bus interface logic in the register domain, the bus interface logic reassembling the at least one streamed transaction for data access operations at the common registers.

2. The system of claim 1 further comprising a semaphore in the register domain, the semaphore arbitrating access by a plurality of processing cores to the common registers.

3. The system of claim 1 further comprising a switch in the core domain, the switch determining if the at least one transaction is addressed to the common registers or a core register.

4. The system of claim 1 wherein the bus interface logic includes a write staging register for writing data associated with a write transaction to the common registers.

5. The system of claim 1 further comprising a synchronizer between the core domain and the register domain, the synchronizer timing transfer of the at least one streamed transaction between the core domain and the register domain.

6. The system of claim 1 wherein the bus interface logic streams data read from the common registers in the register domain, and the core logic reassembles the streamed data in the core domain.

7. The system of claim 6 wherein the core logic includes a read buffer for reassembling the streamed data in the core domain.

8. The system of claim 6 further comprising a synchronizer between the core domain and the register domain, the synchronizer timing transfer of the streamed data between the register domain and the core domain.

9. The system of claim 1, wherein core registers in the multi-core processor are linked to one another in a crab-chain arrangement.

10. The system of claim 9, wherein the crab-chain arrangement is an interface between the core registers within each processing core.

11. The system of claim 9, wherein transactions are issued as segments for delivery from one core register to a next core register in a chain arrangement.

12. The system of claim 9, wherein the common registers are shared by two or more processing cores.

13. The system of claim 9, wherein the different clock domains are different areas of the multi-core processor operating at different frequencies.

14. The system of claim 5 further comprising a throttling mechanism to issue a control signal to a write interface to discard transaction segments based on a threshold for a queue for the synchronizer.

15. A system for accessing common registers in a register domain in a multi-core processor, comprising:
   means for transferring at least one transaction in segments from a core domain to a register domain, both the core domain and the register domain being different clock domains in the same multi-core processor; and
   means for reassembling the at least one transaction in the register domain for data access operations at the common registers.

16. The system of claim 15 further comprising:
   means for transferring data in segments from the register domain to the core domain; and
   means for reassembling the data in the core domain.

17. The system of claim 15 further comprising means for arbitrating access to the common registers.

18. The system of claim 15 further comprising means for synchronizing the segments between the core domain and the register domain.

19. The system of claim 15 further comprising means for linking core registers in the multi-core processor.

20. The system of claim 19 wherein the means for linking is by crab chaining the core registers in the multi-core processor.

* * * * *